United States Patent Office 2,981,277
Patented Apr. 25, 1961

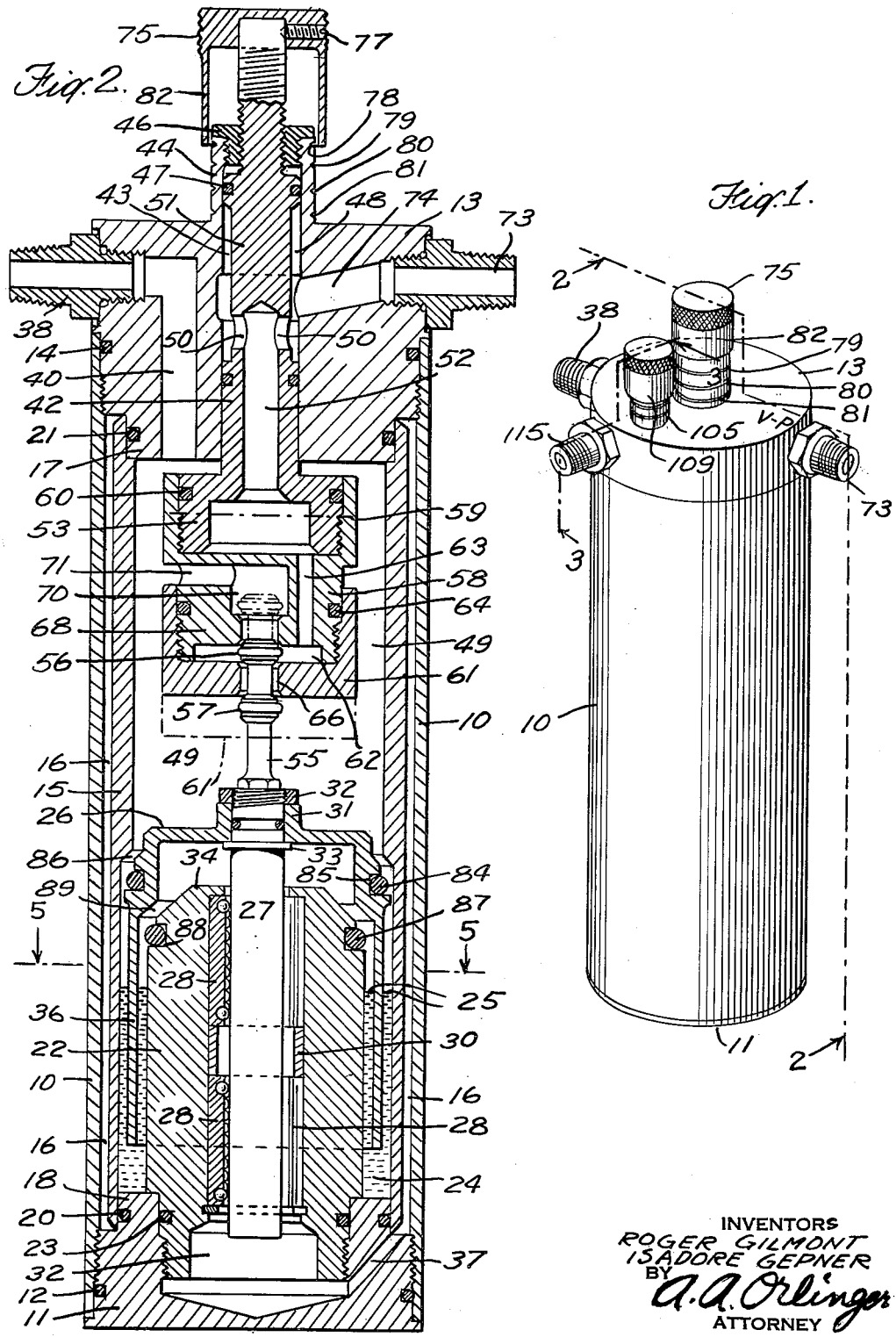

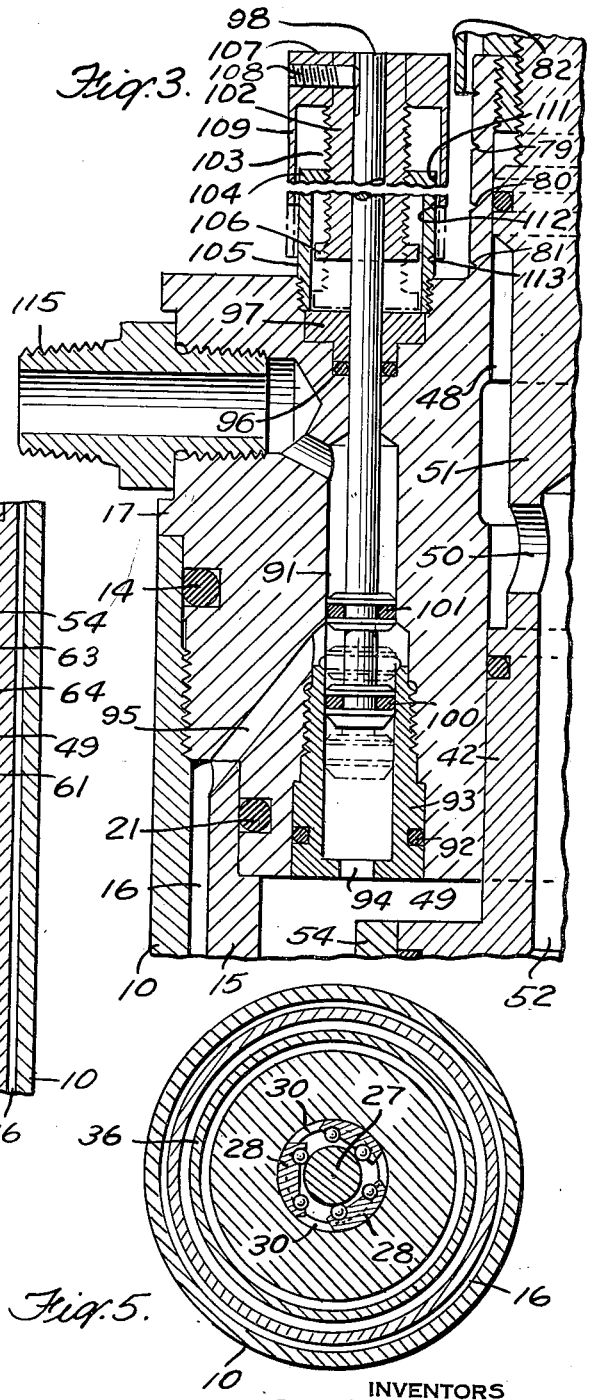

2,981,277

SET PRESSURE HOLDING DEVICE

Roger Gilmont, Douglaston, and Isadore Gepner, Elmont, N.Y., assignors to Manostat Corporation, New York, N.Y., a corporation of New York Filed July 25, 1957, Ser. No. 674,173

5 Claims. (Cl. 137—270)

This invention involves improvements in manostat devices whereby vacuum and pressure in an operating system is controlled by the rise and fall of a gas bell with its lower end submerged in a liquid mercury seal and a part of its top serving as a closure cooperable with an orifice communicating with a vacuum or pressure source.

These devices are the type shown in my February 15, 1955, U.S. Patent No. 2,702,047. Their basic theory, design and fundamental operation, as available before this invention, are explained in my papers "Theory and Operation of a Cartesian Diver Type of Manostat," in the Analytical Edition of Industrial and Engineering Chemistry, volume 18, No. 10 (October 15, 1946), page 633, and "Design and Operational Characteristics of Cartesian Manostats," in Analytical Chemistry, volume 23, January 1951, page 157.

The device of my Patent 2,702,047 has means that serve, after the operating system controlled by it has been shut down, for the system on being re-started to be directly reset and maintained again at its same vacuum level at which it had been operating before the shut down, and without expenditure of time and effort to work out again the necessary setting to accomplish that. That is often referred to as the so-called vacuum memory means. However, it is not amenable to reversal to give quite similar service for pressure operation.

The prior devices also manifest certain limitiations as to sensitivity and facility and speed of response to vacuum or pressure changes. Moreover, the designs of the prior devices present a number of possibilities of undesirable unintentional leakage and for injury to exposed parts.

The manostat device of the invention lacks those various short-comings and disadvantages. Thus a significant beneficial feature of the improved manostat of the invention is that it has both vacuum and pressure memory means.

Another advantageous feature of the invention device is in its divided stream orifice that enables maintaining high sensitivity even with high flow volume through the device, for example, ten-fold volume flow without decrease in sensitivity; and also allows the device to be direct as well as indirect acting.

A further valuable feature of this improved device is its rugged structure enclosing practically all of its parts that might otherwise be prone to leakage or to injury or breakage.

Yet another significant feature of the new device is its unusual sensitivity, and highly rapid response, to changes in the system being controlled, by practical elimination of frictional resistance to the rise and fall of the bell float, except as to its buoyancy.

Other new features of this improved manostat will not be recognized from its more detailed description given below in relation to the drawings, wherein:

Fig. 1 is a perspective view of the improved manostat of the invention, showing its sturdy, rugged assembly with merely its two operating knobs and its two line connections and vent outlet exposed;

Fig. 2 is a vertical cross-section (looking in the direction of the arrow) along the line 2—2 of Fig. 1, i.e. through the axis of the device and its side-arm, line connections, one for the system to be controlled and the other to the vacuum or pressure source, and showing the relationship between the primary control parts and the major fluid passages and chambers;

Fig. 3 is a fragmentary vertical section of the upper part of the device and along the line 3—3 of Fig. 1, looking in the direction shown by the arrows, and taken at an angle of ninety degrees clockwise of the view of Fig. 2, and showing the valve serving selectively to set up the equilibrium position or to vent the space under the gas bell to the atmosphere;

Fig. 4 is a fragmentary portion of Fig. 2 and shows the inverted gas bell in its highest attainable operating position and resulting from a drop in pressure in the system being controlled; and Fig. 5 is a horizontal cross-sectional along the line 5—5 of Fig. 2, and looking in the direction indicated by the arrows.

As seen from Figures 2, 4 and 5, the manostat device or instrument of the invention is a gas-tightly closed cylinder which comprises an upright cylindrical outer or housing shell 10 closed at its bottom by bottom-sealing-plug 11 threaded in gas-tight fit into the inner threaded lower end of the housing shell. Gas-tight engagement there is assured by O-ring gasket 12. Housing shell 10 is closed at its top by the header-cap 13 also threaded in gas-tight fit into the inner threaded upper end of housing 10, with gas-tight fit there assured by O-ring gasket 14.

Inner tube or sleeve 15 extends, concentrically and inwardly spaced away from the inside of housing 10 thereby forming the annular conduit or connecting passage 16 enclosed between them, with its upper end in gas-tight friction fit over the narrowed depending extension 17 of header-cap 13 and its lower end likewise in gas-tight friction fit over the opposed narrowed upstanding extension 18 of bottom-sealing-plug 11. Gas-tight fit of sleeve 15 is assured at its opposite ends by O-rings 20 and 21 respectively.

Central pressure equalizing tube 22 is supported axially centrally with its lower end threaded in gas-tight fit into bottom-sealing-plug 11, with gas-tight fit assured by O-ring 23. The inner side of the lower part of sleeve 15 forms with the top of upstanding extension 18 and the outer side of central tube 22 an annular vessel or container 24 for holding a supply of mercury 25.

Open-bottomed bell or setting and adjusting float 26 is restrained against side to side swing or vibration by float guide 27 which is supported for axially vertical movement beneficially by a pair of linear ball bearings 28, with each pair encircling the float guide, and in this case separated by a spacer ring 30. In this modification, float guide 27 is removably and gas-tightly secured to float 26, with its upper end extending advantageously in friction-tight fit through an open-ended boss 31 in the top of the float and with float guide nut 32 screwed down on the top exposed threaded end of guide 27 until its annular flange 33 and nut 32 are gas-tightly drawn against the under-side of the top of float 26 and the outer end of boss 31, respectively.

The upper fluid outlet end 34 of central tube 22 opens into the under-side of the top of float 26. The latter is supported for easy up and down movement by its skirt 36 depending between and concentrically spaced away from both central tube 22 and sleeve 15 and in part submerged in the annular body of mercury 25. The open bottom end of central tube 22 communicates with annular passage 16 through at least one connecting conduit 37.

The same vacuum or pressure level existing at any time in an outside system that is to be controlled by operation of the manostat exists also in it in its zone outside of and above its float. That can be called the working or adjusting zone. To control that vacuum or pressure at a selected level, the device matches that existing level against the vacuum or pressure level of the gaseous fluid trapped within the float (i.e. above the mercury). That can be called the setting zone.

Accordingly, the working or adjusting zone is to be connected to the system being controlled and at the same time to a vacuum or pressure source, depending on which is being controlled, which the device brings into operation when it detects in the system being controlled a lowering of the selected vacuum (i.e. actual absolute pressure) or pressure level.

For those purposes, the connections to be used to communicate with the system to be controlled and to either the vacuum or pressure source, and the internal conduits to communicate with them and the means for selectively making the settings and the various desired interconnections are associated with and operable through header-cap 13.

System coupling 38 is provided in gas-tight fit in a tapped hole in header-cap 13, to permit the system to be controlled to communicate with the working or adjusting zone through system conduit 40.

Control orifice levelling stem 42 is rotatably mounted in gas-tight fit in the axial run bore 43 extending through header-cap 13 and its axially upward extension neck 44. Control stem 42 is also longitudinally axially movable by engagement of its threaded narrowed upper end portion 45 with the inside threads of header-cap bushing 46. The latter is held removably secured by its outside threads engaging the inside threads of the extension neck 44.

The gas-tight fit of levelling stem 42 in bore 43 is enhanced by the O-ring 47 below the narrowed portion 45 and a second O-ring shortly above the lower end of bore 43. Levelling stem 42 is reduced in diameter in a portion intermediate these two O-rings, thereby forming an annular passage 48 that communicates through at least two ports 50 (located conveniently in the lower end of this reduced-in-diameter portion 51 of levelling stem 42) with a longitudinal bore 52 running from these ports 50 centrally downwardly through the lower part of levelling stem 42 and at its lower end the open-ended orifice-holding head 53 located within the working or adjusting zone 49, to communicate with that zone through the branched or dual orifice, as explained below.

Rigidly, and preferably removably, secured to the top of float guide 27 is orifice-seal spindle 55 having at its upper end the top or upper orifice-seal 56 and intermediate its ends, the lower orifice-seal 57. Each of these seals is adapted to seal an orifice, advantageously by an O-ring whose outer periphery has a greater diameter than that of the flanges retaining it in place. These seals then may be referred to conveniently as orifice sealing-rings 56 and 57 respectively.

Orifice-piece 58 has an upper attaching cup portion 59 internally threaded in its lower part whereby the orifice-piece is gas-tightly, but removably secured to, the anchoring head 53. Gas-tight fit is enhanced by O-ring 60.

The lower portion of orifice-piece 58 contains the branched orifice outlets and conduit passages connecting them with the bore in the lower end of orifice-levelling stem and the working or adjusting zone 49.

The downwardly facing central recess in the bottom of orifice-piece 58 is enclosed by orifice-head 61 thereby providing the intercommunicating chamber 62 which serves a dual function as will be later seen. Vertical connecting passage 63, links the interior of chamber 62 with the open bottom end of bore 52.

Orifice-head 61 is threaded onto orifice-piece 58 in gas-tight fit aided by use of O-ring 64. Lower orifice 66 runs centrally through the bottom of orifice-head 61 and co-axial with orifice spindle 55.

Similarly, upper orifice 68 runs centrally through the bottom of orifice-piece 58, co-axial with the lower orifice and with both of them communicating with chamber 62. The latter must be high enough to allow passage of gaseous fluid through it when the upper orifice-seal is out of contact with the beveled seating portions of both orifices.

Superimposed on the upper orifice and co-axial and communicating with it is the orifice-seal extension-chamber 70 communicating with adjustment zone 49 through branch-port 71.

The diameter of extension-chamber 70 must be greater than the diameter of the periphery of seal-ring 56, and its height greater than that of orifice-seal 56, so that gaseous fluid can flow through it when orifice-seal 56, so that gaseous fluid can flow through it when orifice-seal 56 is in chamber 70 and out of contact with its beveled seat.

Pressure-change-source coupling 73 is provided likewise in gas-tight fit in a tapped hole in header-cap 13, conveniently diametrically opposite system-coupling 38, and communicating with annular passage 48 through branch line 74. O-rings between each of these two couplings and header-cap 13 enhance their gas-tight fit.

It is advantageous to place on the outside of the apparatus some mark, for example, V—P (as in Fig. 1), to identify one of these two couplings, for example, coupling 73.

Control-orifice-leavelling stem or screw 42 is rotated by turning orifice adjustment knob 75 fixed by set screw 77 to the extension of orifice screw 42 above the top of header-cap bushing 46.

Spaced apart vertically from one another about neck extension 44 are engraved four orifice elevation indicator lines 78, 79, 80 and 81. Line 78 corresponds to the maximum vacuum position of the orifice.

The height to which orifice screw 42 can be raised above the top of bushing 46 is so related to the length of depending skirt 82 of knob 75 to enable the lower edge of the skirt to travel from indicator line 78 to line 81.

O-ring 84, held at a fixed elevation about float 26 within its annular grove 85, is provided to engage the inwardly extending downwardly facing annular shoulder 86 in inner shell 15. That will occur when, after operation had been shut down in a system that had been held at a selected vacuum level under control by the device of the invention, it was resumed by the pull of a vacuum by a vacuum pump connected to coupling 73 and that vacuum level is reached again in the system.

O-ring 87, held at a fixed elevation about the upper end of central tube 22 within its annular groove 88, is provided to be engaged by the inwardly extending and downwardly facing shoulder 89 near the top of the inner wall of float 26. That will occur, when after operation had been shut down in a system that had been held at a selected pressure level by control from the device of the invention, it was resumed by the delivery of compressed gaseous fluid by a compressor connected to coupling 73 and that pressure level is reached again in the system.

Fig. 3 shows primarily what may briefly be called the equilibration valve because of one of its functions. It is housed and operates in vertical bore 91 extending vertically through headercap 13, and has varied diameters respectively at several elevations for different purposes, as will be seeen, being widest at its upper and lower ends.

Into its lower end, there is fitted in gas-tight fit, enhanced by O-ring 92, and in the threaded engagement, its lower valve base 93 which through its orifice 94 communicates with working zone 49. From just about above the upper end of base 93, this not yet narrowed part of bore 91 communicates through connecting conduit 95 with annular passage 16.

Into its upper end of bore 91, and with its top positioned below the top edge of header-cap 13, there is fitted, enhanced by O-ring 96, the upper base 97 of this three-way valve. In the latter and co-axial with bore 91 is a vertical aperture, through which valve stem 98 is snugly held for longitudinally axial movement within bore 91.

Held between parallel flanges at the lower end of valve stem 98, O-ring 100 serves as the lower seal (identically numbered) for this valve. Spaced shortly above seal 100 and likewise held between parallel flanges, O-ring 101 serves as the upper seal (also numbered 101) for this valve. The diameter of the outer periphery of O-rings 100 and 101 is such as to provide gas-tight fit with bore 91 when in contact with it.

The distance between these seals 100 and 101 is such that when valve stem 98 is in the differential (i.e. lowest) position in bore 91, seal 101 will be below the junction of conduit 95 with bore 91 to allow communication between them; and when stem 98 is raised to carry seal 101 to a level just above that junction, seal 100 will be below that junction and thereby cut off communication between conduit 95 and bore 91 (the operating position); and then to enable valve stem 98 to be raised high enough to permit seal 100 to be carried to a level just above that junction thereby to allow conduit 95 to communicate with the part of bore 91 below that junction and orifice 94 (the equilibration position), while at the same time still cutting off communication from conduit 95 to that port of bore 91 above the junction between them.

To enable longitudinal axial movement of valve stem 98, along its upper end there is, preferably removably, affixed propelling-sleeve 102 with threads 103 on its outer cylindrical surface in registry with corresponding threads inside an aperture in the top of propelling-sleeve base 104. The latter by threads on the outside of the lower end of its depending apron 105 is removably screwed into the tapped depression in header-cap 13 above upper base 97.

Flange 106 at the lower end of sleeve 102 prevents it from being removed through the top of sleeve base 104. Then valve adjustment knob 107 is removably secured by set screw 108 to sleeve 102 and valve stem 98. Thereby by turning knob 107 sleeve 102 is turned and imparts longitudinal axial movement to valve stem 98.

Spaced apart vertically from one another about skirt 105 of sleeve base 104 are engraved three seal elevation indicator lines. Line 111 corresponds to the equilibration position of the valve, line 112 shows its operation position (as in Fig. 3); and line 113 indicates its differential position (as shown in phantom in Fig. 3).

The latter sets up communication between conduit 95, the portion of bore 91 above their junction, and vent-port 114 to coupling 115.

In preparing the device for use there is first put together in obvious manner a sub-assembly comprising bottom-plug 11, central equalizing tube 22, and the linear ball bearings (ball bushings) 28 and spacer ring 30, with the float guide 27 and float 26, with the orifice seal spindle attached to it. Then the bottom end of inner tube 15 is forced into fit over upstanding extension 18 (of bottom-plug 11), and a suitable quantity of mercury or other non-wetting liquid (i.e. that will not wet the parts) is fed into the thereby formed annular vessel 24, for the float to rest approximately midway between its upper end lower limits of motion.

The housing shell 10 is threaded into place. Then another sub-assembly comprising header-cap 13 and all of the parts shown in the drawings as suspended and supported from it, is fitted into the upper end of the inner tube and of the housing shell respectively and screwed into tight engagement with the latter.

To use the device for maintaining in a system a selected vacuum level, by direct action, the system to be controlled is connected to coupling 38 and coupling 73 (identified by the marking V—P on the top of header-cap 13) is connected to the vacuum source. Orifice adjustment knob 75 is rotated to its maximum position (i.e. to expose indication line 78) and then is screwed down till the bottom edge of its apron 82 coincides with indication line 79. That position is the middle of the vacuum operating range, the limits of which are shown by indication lines 78 and 80.

Valve turning knob 107 then is rotated to its highest position (i.e. to expose indication line 111). Then the vacuum source is turned on until the desired absolute pressure (indicating the desired vacuum level) is reached, as shown by a suitable vacuum guage. Then the vacuum source is turned off.

While the thus obtained absolute pressure is in effect, turning-knob 107 is turned down until the bottom edge of its skirt 109 coincides with indication line 112 (representing the operation position); the desired absolute pressure having been set up under float 26 on closing the three-way valve after equilibration. The vacuum source is then turned on again and the device of the invention will hold the pressure approximately at the setting.

Orifice adjustment knob 75 is then raised or lowered cautiously until the exact vacuum level desired is reached (raising knob 75 reduces the actual pressure, while lowering the knob does the reverse).

When the system loses vacuum due to leakage (i.e. increases in actual pressure), the pressure is similarly increased in working and adjusting zone 49. The resulting higher pressure there causes float 26 to fall. That in turn lowers orifice-seal spindle 55 thereby drawing orifice-seals 56 and 57 away from contact with orifices 68 and 66 respectively.

Those two orifices, thus having been opened, thereby set up communication from coupling 73 through branch line 74, ports 50, longitudinal bore 52, vertical connecting passage 63, intercommunicating chamber 62, through orifice 66 to zone 49, as well as to orifice 68 and through extension-chamber 70 and branch-port 71 to zone 49.

Thereby the vacuum source acts on working and adjusting zone 49, reducing the pressure in it (i.e. increasing the vacuum) and then through system conduit 40 and coupling 38 in turn doing likewise in the system.

The foregoing procedure repeats itself at any time that the system loses vacuum due to leakage.

Independently, the device of the invention, by a simple change in the elevation of orifice-seals 66 and 68, in correspondingly similar manner automatically can serve to maintain an operating system at any particular super-atmospheric pressure.

To convert to operation to control such pressure, orifice adjustment knob 75 is turned down until the lower edge of its depending skirt 82 coincides with indication line 80 (representing the maximum of the pressure operating range).

In doing so, the combination consisting of orifice-anchoring head 53, orifice-piece 5 and orifice head 61 is lowered. That lowers orifices 68 and 66 over the resilient O-rings constituting upper and lower orifice-seals 56 and 57, so that they pass respectively through orifices 68 and 66 and enter orifice-seal extension chamber 70 and intercommunicating chamber 62 respectively.

The thus modified arrangement is briefly referred to as the reverse acting operating. In it the system to be maintained at a selected elevated pressure is connected to coupling 38, and a source of pressure is connected with coupling 73.

Orifice adjustment knob 75 is then turned until its skirt 82 reaches the lowest position, i.e. about indication line 81. Knob 75 is then reversed to raise it till the lower edge of its skirt coincides with indication line 80 (that is the middle of the pressure operating range, the limits of which are shown by indication lines 79 and 80, the minimum and maximum respectively).

The device is then equilibrated by raising turning knob to its highest position (i.e. with the bottom edge of its skirt 109 coinciding with indication line 111). That raises the valve seals 101 and 100 to a level in bore 91 above its junction with connecting conduit 95. Thereby communication is established between the working and adjustment zone 49 and the zone under float 26 with resultant equalization of the pressure between them. The communication between these zones is established through orifice 94 of the three-way valve to conduit 95 to annular passage 16, connecting conduit 37 to the zone under float 26.

The pressure source then is turned on to propel gaseous fluid to the manostat and through it to the system to be controlled, and then turned off. The pressure source can be approximately ten to fifteen pounds per square inch over the pressure desired. More or less may be used depending upon the rate of flow required. While this pressure is being held, knob 107 is turned until the lower edge of its skirt coincides with indication line 112 (the operating position).

The pressure source is then turned on again and the device will hold the pressure at this approximate setting. Orifice adjustment knob 75 then is turned up or down until the exact pressure to be maintained is shown by an independent pressure guage (elevating knob 75 reduces the pressure; lowering it increases the pressure).

With the device in the direct action setting, gaseous fluid flow under vacuum can be controlled, or a selected vacuum level can be maintained even with the device hooked into a shunt line. It is also possible to maintain a selected pressure in a system by direct connection between the pressure source and the system, by bleeding off the excess pressure through the manostat and exhausting it to the atmosphere. Flow control of gaseous fluid under pressure is also possible.

By the reverse action set up, it is also possible to maintain flow control under pressure, and also to maintain a fixed flow control under vacuum; also possible to maintain a selected vacuum level in a system, as well as to fill containers, such as vacuum tubes with any selected gas under select vacuum conditions.

Under any of the direct or indirect arrangements for working under vacuum or under pressure, after the entire system has once been operating and then is shut down for any purpose for any time, no further steps are needed to set the system back into operation again at the same vacuum or pressure level at which it was operated before being shut down, other than merely to turn on again the vacuum or pressure source. This results from the separate efficient vacuum-setting memory means and pressure-setting memory means of the device and its efficient leak-proof structure.

When a system operating under vacuum is shut off, there is trapped under float 26 a quantity of gas sufficient to reproduce the selected operating vacuum, as the float may sink in the mercury under its own weight.

Then when the system is started again under vacuum, the pressure is reduced in the working or adjustment zone 49. Then as its pressure is falling, float 26 is raised by the expansion of the gas trapped under it until O-ring 84 contacts shoulder 86 when the desired vacuum level is reached, because that was their positional relationship that existed when the device had been operating under that vacuum level before having been shut down.

When a system operates under pressure, shoulder 89 on the inside of float 26 is in contact with O-ring 87 near the top of central tube 22. When such a system is shut down and the operating pressure no longer exists in the working and adjusting zone 49, float 26 will rise under the expansion of the gas trapped under it.

When a system operates under pressure, shoulder 89 on the inside of float 26 is in contact with O-ring 87 near the top of central tube 22. When such a system is shut down and the operating pressure no longer exists in the working and adjusting zone 49, float 26 will rise under the expansion of the gas trapped under it.

Then when that system is started again under pressure, as the pressure then is increased in adjustment zone 49, float 26 is finally forced down to where its inside shoulder 89 contacts O-ring 87 when the pressure in zone 49 reached the desired level equivalent to the pressure of the gas trapped under float 26 at that point.

That lowering of float 26 simultaneously lowered orifice seals 56 and 57 from their positions shown in phantom in Fig. 2 to close off the orifices 68 and 66 respectively, and corresponding to that which existed when they were operating before the shut down.

While the nature of the invention has been explained by detailed description of a specific embodiment of it, it is understood that various modifications and substitutions can be made in any of the elements or combinations of them in the illustrative embodiment, within the scope of the appended claims which are intended to embrace also equivalents of such specific embodiment.

What is claimed is:

1. In a device whereby a selected level of absolute pressure is maintained in an operating system by the rise or fall of a gas bell float responsive respectively to a decrease or increase in pressure on its top and with its lower end submerged in a liquid mercury seal and its top serving as a closure cooperable with an orifice above it communicating with a vacuum or pressure source depending respectively on whether the operating system is under vacuum or pressure, the improvement which comprises means for eliminating friction from retarding the ready rise and fall of the float, which means includes a float guide depending vertically from the top of the float and longitudinally axially movable within linear ball-bearing bushings spaced about said float guide.

2. In a device as claimed in claim 1, the modification wherein the vertically depending float guide is co-axial with the float and the ball-bearing bushings are supported in the inner wall of an inner concentric tube having its outer surface spaced radially inwardly from the inner surface of the depending skirt of said float.

3. In a device whereby a selected level of absolute pressure is maintained in an operating system by the rise or fall of a gas bell float responsive respectively to a decrease or increase in pressure on its top and with its lower end submerged in a liquid mercury seal and its top serving as a closure cooperable with an orifice in a conduit rising above it and communicating with a vacuum or pressure source depending respectively on whether the operating system is under vacuum or pressure, the improvement which comprises a division of such orifice into branched orifices co-axially vertically spaced apart from one another, and a spindle extending upwardly from the float and carrying co-axially vertically spaced apart from one another orifice-seals to close off simultaneously the branched orifices, under the influence of changes in the difference in pressure above and below the float; and means for eliminating friction from retarding the ready rise and fall of the float, which means includes a float guide depending vertically from the top of the float and longitudinally axially movable within linear ball bearing bushings spaced about said float guide.

4. In a device whereby a selected level of absolute pressure is maintained in an operating system by the rise or fall of a gas bell float responsive respectively to a decrease or increase in pressure on its top and with its lower end submerged in a liquid mercury seal and its top serving as a closure cooperable with an orifice in a conduit rising above it and communicating with a vacuum or pressure source depending respectively on whether the operating system is under vacuum or pressure, the improvement which comprises a division of said conduit at said orifice end thereof into two branches and providing in each such branch an orifice so positioned as to the other that both orifices are co-axially vertically spaced apart from one another, and a spindle extending upwardly from the float and carrying co-axially vertically spaced apart from one another orifice-seals to close off simultaneously the branched orifices, under the influence of changes in the difference in pressure above and below the float; and means for equalizing the pressure in the zone above the float with that of the gas trapped under the float by the mercury seal, which means comprises a housing enclosing said float and at least part of said conduit, a second conduit which is enclosed within said housing and interconnects both sides of said bell float, and means whereby communication through said second conduit with both sides of the float can be cut off.

5. In a device whereby a selected level of absolute pressure is maintained in an operating system by the rise or fall of a gas bell float responsive respectively to a decrease or increase in pressure on its top and with its lower end submerged in a liquid mercury seal, whereby gas is trapped by said seal under said float, and its top serves as a closure cooperable with an orifice in a conduit rising above it and communicating with a vacuum or pressure source depending respectively on whether the operating system is under vacuum or pressure, the improvement which comprises means for equalizing the pressure in the zone above the float with that of the gas trapped under the float by the mercury seal, which means comprises a housing enclosing said float and at least part of said conduit, and an annular passage between the outer housing shell of the device and an inner concentric tube having its outer surface spaced radially inwardly from the inner surface of the housing shell, and a conduit communicating with said annular passage and the space within the float remote from the mercury seal.

References Cited in the file of this patent
UNITED STATES PATENTS

| | | |
|---|---|---|
| 281,449 | Carter | July 17, 1883 |
| 858,442 | Cowie | July 2, 1907 |
| 2,436,350 | Bader | Feb. 17, 1948 |
| 2,702,047 | Gilmont | Feb. 15, 1955 |